(12) United States Patent
Wang et al.

(10) Patent No.: US 10,890,160 B2
(45) Date of Patent: Jan. 12, 2021

(54) CONTROL SYSTEM OF A WIND TURBINE GENERATOR

(71) Applicants: WIND POWER TECHNOLOGY CENTER OF GANSU ELECTRIC POWER COMPANY, Qilihe District Lanzhou (CN); STATE GRID CORPORATION OF CHINA, Xicheng District (CN); GANSU ELECTRIC POWER COMPANY OF STATE GRID, Chengguan District Lanzhou (CN); SHANGHAI JIAO TONG UNIVERSITY, Minhang District (CN)

(72) Inventors: Ningbo Wang, Lanzhou (CN); Liang Lu, Lanzhou (CN); Kun Ding, Lanzhou (CN); Shiyuan Zhou, Lanzhou (CN); Chen Zhang, Minhang District (CN); Jin Li, Lanzhou (CN); Zheng Li, Minhang District (CN); Nianzong Bai, Lanzhou (CN); Jing Zhi, Lanzhou (CN); Xu Cai, Minhang District (CN); Zifen Han, Louzhou (CN); Youming Cai, Minhang District (CN)

(73) Assignees: Wind Power Technology Center of Gansu Electric Power Company, Lanzhou (CN); State Grid Corporation of China, Beijing (CN); Gansu Electric Power Company of State Grid, Lanzhou (CN); Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 16/081,900

(22) PCT Filed: Feb. 8, 2017

(86) PCT No.: PCT/CN2017/073109
§ 371 (c)(1),
(2) Date: Sep. 1, 2018

(87) PCT Pub. No.: WO2017/148251
PCT Pub. Date: Sep. 8, 2017

(65) Prior Publication Data
US 2019/0072070 A1 Mar. 7, 2019

(30) Foreign Application Priority Data
Mar. 1, 2016 (CN) .......................... 2016 1 0116411

(51) Int. Cl.
*F03D 7/00* (2006.01)
*F03D 7/02* (2006.01)
(Continued)

(52) U.S. Cl.
CPC .......... *F03D 7/028* (2013.01); *F03D 7/0284* (2013.01); *F03D 7/047* (2013.01); *F03D 9/11* (2016.05);
(Continued)

(58) Field of Classification Search
CPC ........ F05B 2220/30; F05B 2220/70646; F05B 2260/42; F05B 2260/80;
(Continued)

(56) References Cited

U.S. PATENT DOCUMENTS

| | | | | |
|---|---|---|---|---|
| 2009/0121483 A1* | 5/2009 | Xiong | ................... | F03D 7/0272 290/44 |
| 2011/0089693 A1* | 4/2011 | Nasiri | ................... | F03D 7/0272 290/44 |

(Continued)

FOREIGN PATENT DOCUMENTS

| | | |
|---|---|---|
| CN | 101621204 A | 1/2010 |
| CN | 101871433 A | 10/2010 |

(Continued)

OTHER PUBLICATIONS

International Search Report; PCT Application No. PCT/CN2017/073109 filed on Feb. 8, 2017.
(Continued)

Primary Examiner — Julio C. Gonzalez
(74) Attorney, Agent, or Firm — Arent Fox LLP (57) ABSTRACT

The present disclosure discloses a control system for enhancing a frequency support capability of a wind turbine generator system. The control system includes a wind turbine, a gearbox, an electric generator and a converter. The control system is characterized by further including a supercapacitor energy storage apparatus, which includes a DC-DC converter and a supercapacitor. The converter includes DC buses, and the supercapacitor is electrically connected to the DC buses via the DC-DC converter. The supercapacitor may be orderly charged or discharged according to an operating state of the wind turbine generator system to maintain its operating condition, and has a superior reliability.

13 Claims, 6 Drawing Sheets (51) Int. Cl.

| | | |
|---|---|---|
| H02J 3/24 | (2006.01) | |
| H02P 9/10 | (2006.01) | |
| F03D 9/11 | (2016.01) | |
| F03D 9/25 | (2016.01) | |
| F03D 17/00 | (2016.01) | |
| F03D 7/04 | (2006.01) | |
| H02P 9/46 | (2006.01) | |
| H02P 101/15 | (2016.01) | |

(52) U.S. Cl.
CPC ............... *F03D 9/25* (2016.05); *F03D 17/00* (2016.05); *H02J 3/24* (2013.01); *H02P 9/10* (2013.01); *H02P 9/46* (2013.01); *H02P 2101/15* (2015.01); *H02P 2201/07* (2013.01); *H02P 2201/09* (2013.01); *H02P 2201/11* (2013.01)

(58) Field of Classification Search
CPC ...... F05B 2270/10711; F05B 2270/337; F03D 17/00; F03D 7/0284; F03D 9/11; F03D 9/255; H02P 2101/15; H02P 9/006; H02P 9/007; H02P 9/102; H02P 9/105; H02P 9/305; H02J 3/16; H02J 3/38; H04M 5/4585; Y02A 30/62
USPC ...................................................... 290/44, 55
See application file for complete search history.

(56) References Cited

U.S. PATENT DOCUMENTS

| | | | |
|---|---|---|---|
| 2016/0285400 A1* | 9/2016 | Yuan | H02P 9/105 |
| 2019/0123559 A1* | 4/2019 | Dong | H02J 3/28 |

FOREIGN PATENT DOCUMENTS

| | | |
|---|---|---|
| CN | 102780229 A | 11/2012 |
| CN | 103078339 A | 5/2013 |
| CN | 103907259 A | 7/2014 |
| CN | 105226719 A | 1/2016 |
| CN | 105633983 A | 6/2016 |

OTHER PUBLICATIONS

Research on Using Supercapacitor to Enhance the Tolerance of Doubly-Fed Wind Generator Under Low Voltage Fault, Gu Jingming, Zhang Chen, Gao Qiang, Li Zheng, Cai Xu (Wind Power Research Center, Shanghai Jiaotong University, Shanghai 200240, China).
CN Office Action; dated Aug. 29, 2017; Application No. 201610116411.6.

\* cited by examiner

CONTROL SYSTEM OF A WIND TURBINE GENERATOR

CROSS-REFERENCES TO RELATED APPLICATIONS

This is a National Stage Application, filed under 35 U.S.C. 371, of International Patent Application No. PCT/CN2017/073109, filed on Feb. 8, 2017, which claims priority to Chinese patent application No. 201610116411.6 filed on Mar. 1, 2016, contents of both of which are incorporated herein by reference in their entireties.

TECHNICAL FIELD

The present disclosure belongs to the field of the operation control of wind power generation, and, in particular, relates to a control system for enhancing a frequency support capability of a wind turbine generator system.

BACKGROUND

A modern wind turbine generator system may realize a variable-speed constant-frequency operation under the control of a converter. Advantages of such a control are as follows: under the premise of ensuring synchronization with a power grid, the wind energy may be captured as much as possible by controlling the rotational speed according to pneumatic characteristics of a blower, and a power response speed is high. It can be seen that the wind turbine generator system belongs to a non-synchronous power supply, and its mechanical rotational speed is decoupled from the power grid at a synchronous speed. Such a control is good for wind energy capture and power generation quality in a strong power grid, but has many problems in a weak power grid, a micro grid or systems based on new energy resources such as wind energy and photo electricity, which are mainly reflected in reducing the total inertia of the systems and not conducive to the stability of the frequency.

At present, in order to have a inertia support capability and a frequency response capability, the wind turbine generator system is mainly technically modified from two aspects. One aspect is that an auxiliary control loop is added to original power control of the wind turbine generator system. The auxiliary control loop is used for detecting a change rate of the system frequency. The change rate of the frequency is filtered and shaped, and then is superimposed on an original torque command as a torque increment. A mechanical inertia of the wind turbine generator system itself may be extracted by the auxiliary control. Meanwhile, a detection loop for a change amount of the frequency is additionally provided, and the wind turbine generator system may have the frequency response capability according to a set droop curve, but the premise is that the wind turbine generator system has a certain active backup. An implementation method is generally to make the wind turbine generator system run in a power reduction state in a variable speed and pitch combination manner.

The existing art has the following main shortcomings:

a) inertia extraction: the wind turbine generator system will have a reduced rotational speed in an inertia extraction process, the reduced rotational speed will further cause a reduced pneumatic power. If the control is improper, the wind turbine generator system will stall. In addition, excessive extraction of the rotational speed will further cause a secondary drop of the system frequency in a recovery process, which undoubtedly increases the difficulty in designing a controller, and b) frequency response: the wind turbine generator system firstly operates in a power reduction state if it participates in the frequency response, which undoubtedly reduces a power generation amount, so its economic feasibility needs to be further discussed. In addition, since a wind speed fluctuates in real time, the pitch and speed of the active backup for ensuring a constant will be changed frequently, which increases a load of the blower, and has an impact on the stable operation and the service life of the blower.

SUMMARY

In view of this, it is necessary to provide a control system capable of enhancing a frequency support capability of a wind turbine generator system.

A control system for enhancing a frequency support capability of a wind turbine generator system includes a wind turbine, a gearbox, an electric generator and a converter, and further includes a supercapacitor energy storage apparatus. The supercapacitor energy storage apparatus comprises a DC-DC converter and a supercapacitor, wherein the converter comprises DC buses, and the supercapacitor is electrically connected to the DC buses via the DC-DC converter.

In this application, the supercapacitor is used for enhancing the frequency support capability of the wind turbine generator system, which may effectively solve a problem that a grid-connected doubly-fed wind turbine generator system is small in inertia and has no frequency support. The control system of this application may be used for improving a fault handling capability of the doubly-fed wind turbine generator system, and has inertia support and frequency response capabilities, and also has good technical and economic feasibilities. On this basis, without changing an original control strategy of the wind turbine generator system, compared with the prior art, this application avoids problems of blower stall, secondary frequency drop, fatigue load and the like. The supercapacitor energy storage system may perform an ordered charging or discharging operation according to an operating state of the wind turbine generator system to maintain its own operating condition, and has a superior performance.

DETAILED DESCRIPTION

In order to make objectives, technical solutions and advantages of the present disclosure be clear, the present disclosure will be further described in detail below with reference to accompanying drawings and embodiments. It is understood that the specific embodiments described herein are merely illustrative of the present disclosure and are not intended to limit the present disclosure.

Figure 1:
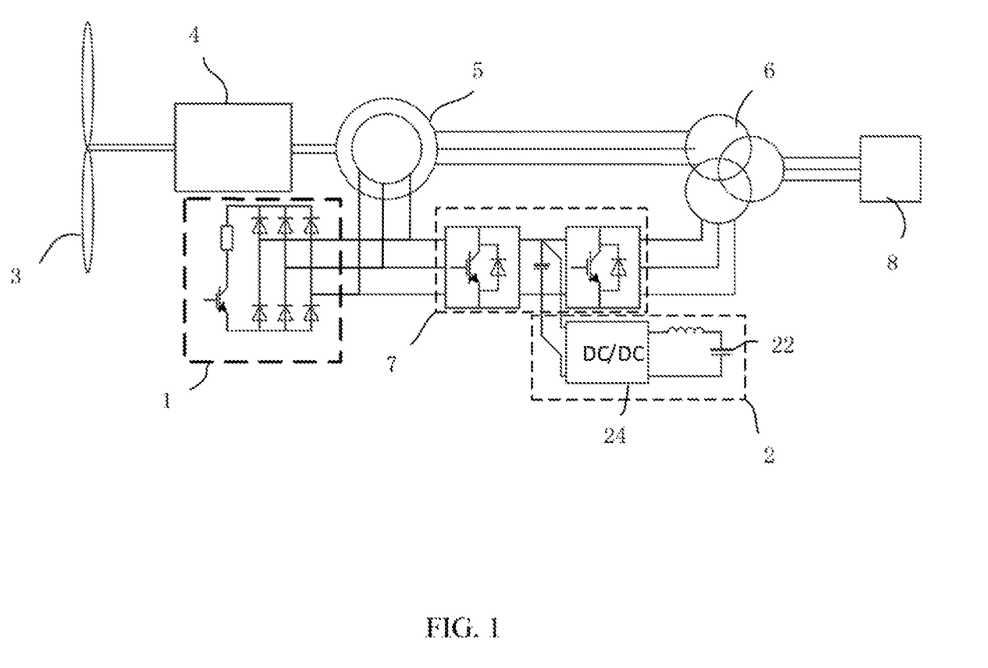
FIG. 1 is a schematic diagram showing a configuration of a main circuit system of a doubly-fed wind turbine generator system according to an embodiment of the present disclosure.

With reference to FIG. 1, an embodiment of the present disclosure provides a control system for enhancing a frequency support capability of a wind turbine generator system, including a doubly-fed wind turbine generator system. The doubly-fed wind turbine generator system includes an electric generator 5, a converter 7 and a supercapacitor energy storage apparatus 2.

The doubly-fed wind turbine generator system may further include a wind turbine 3 and a gearbox 4. The wind turbine 3 drives the electric generator 5 through the gearbox 4, so as to convert wind energy into electrical energy.

The doubly-fed wind turbine generator system may further include a transformer 6, and the doubly-fed wind turbine generator system is connected to a power grid 8 via the transformer 6.

The doubly-fed wind turbine generator system may further include a crowbar protection circuit 1, which is connected to a rotor. When a voltage of the converter 7 exceeds a set threshold, the crowbar protection circuit 1 is turned on to bypass a current on the rotor. The transformer 6 (e.g., a box-type transformer substation) may be a boosting transformer. In one embodiment, the transformer 6 is a 0.69/35 kV boosting transformer with a rated capacity of 3 MVA.

The electric generator 5 may be a doubly-fed induction generator, including a stator and a rotor, where the stator is connected to the power grid 8 via the transformer 6, and the rotor is connected to the power grid 8 via the converter 7.

Figure 2:
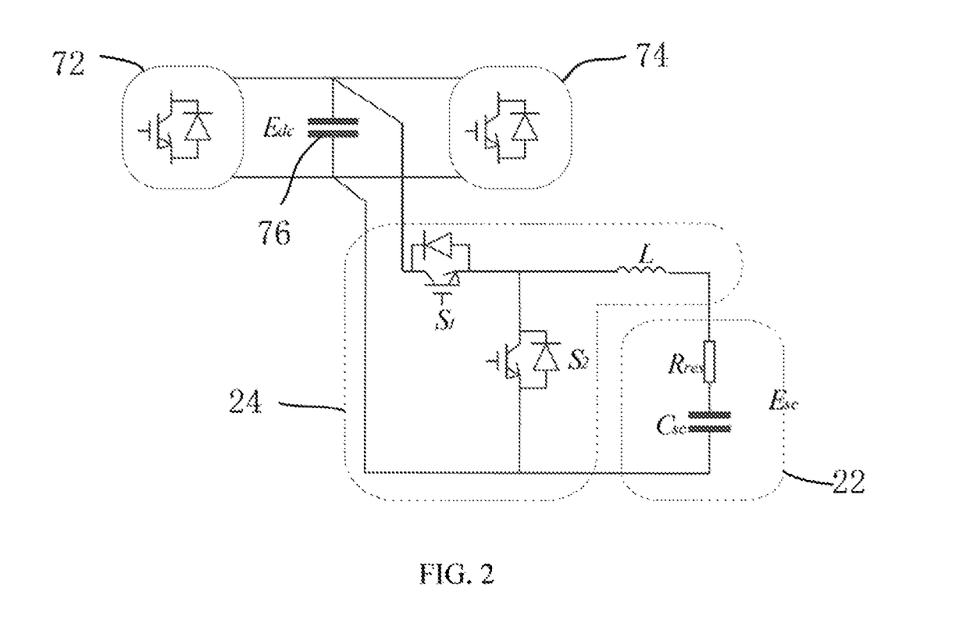
FIG. 2 is a schematic diagram showing a structure of a supercapacitor energy storage apparatus in FIG. 1.

With reference to FIG. 2 together, two ends of the supercapacitor energy storage apparatus 2 are electrically connected to two DC buses of the converter 7, respectively. The converter 7 may further include a rotor-side converter 72 and a grid-side converter 74 electrically connected by the two DC buses, as well as a capacitor 76 two ends of which are electrically connected to the two DC buses respectively. The supercapacitor energy storage apparatus 2 is connected in parallel with the capacitor 76.

The supercapacitor energy storage apparatus 2 includes a DC-DC converter 24 and a supercapacitor 22. The supercapacitor 22 is mounted to the DC buses of the converter 7 and electrically connected to the DC buses of the converter 7 via the DC-DC converter 24, particularly, connected to two DC buses of the converter 7 via the DC-DC converter 24. An equivalent circuit of the supercapacitor 22 in FIG. 2 includes an equivalent capacitor $C_{sc}$ and an equivalent resistor $R_{res}$ connected in series with each other. A rated voltage of the supercapacitor 22 preferably ranges 450 V to 960 V, and the power and the capacity of the supercapacitor 22 theoretically have no upper limits. In one embodiment, the capacity of the voltage $E_{sc}$ of the supercapacitor is 4 F, the power of 350 kW, and a rated voltage of 800 V.

The DC-DC converter 24 is preferably a buck-boost bidirectional converter composed of a first fully-controlled switch S1, a second fully-controlled switch S2 and a boosting inductor L. When electrical energy is transferred from the capacitor 76 of the DC buses to the supercapacitor 22, the supercapacitor is charged, and the DC-DC converter 24 operates in a buck mode. When the electrical energy is transferred from the supercapacitor 22 to the capacitor 76 of the DC buses, the supercapacitor 22 is discharged, and the DC-DC converter 24 operates in a boost mode. By adjusting duty ratios of the switches in the DC-DC converter, specifically duty ratios of the fully-controlled switch S1 and/or the fully-controlled switch S2, the voltage of the supercapacitor 22 may be adjusted, and the duty ratio may be varied between 0 and 1. The voltage of the DC-DC converter 24 is higher than the voltage of the supercapacitor 22.

In one embodiment, a first end of the boosting inductor L is connected in series with the first fully-controlled switch S1, and is connected to a first DC bus of the converter 7 through the first fully-controlled switch S1. A second end of the boosting inductor L is electrically connected to a first electrode of the supercapacitor 22. A second electrode of the supercapacitor 22 is electrically connected to a second DC bus of the converter 7. The second fully-controlled switch S2 is connected between the first end of the boosting inductor L and the second electrode of the supercapacitor. The second fully-controlled switch S2 and the supercapacitor 22 are both connected in parallel with the capacitor 76 of the DC bus.

The first fully-controlled switch S1 includes a first transistor and a first diode connected in parallel. A drain of the first transistor is connected to an anode of the first diode and to the first end of the inductor L. A source of the first transistor is connected with a cathode of the first diode and to one DC bus of the converter 7. The second fully-controlled switch S2 includes a second transistor and a second diode connected in parallel. A source of the second transistor is connected to a cathode of the second diode and to the first end of the inductor L. A drain of the second transistor is connected to an anode of the second diode and electrically connected to the second electrode of the supercapacitor 22.

Figure 3:
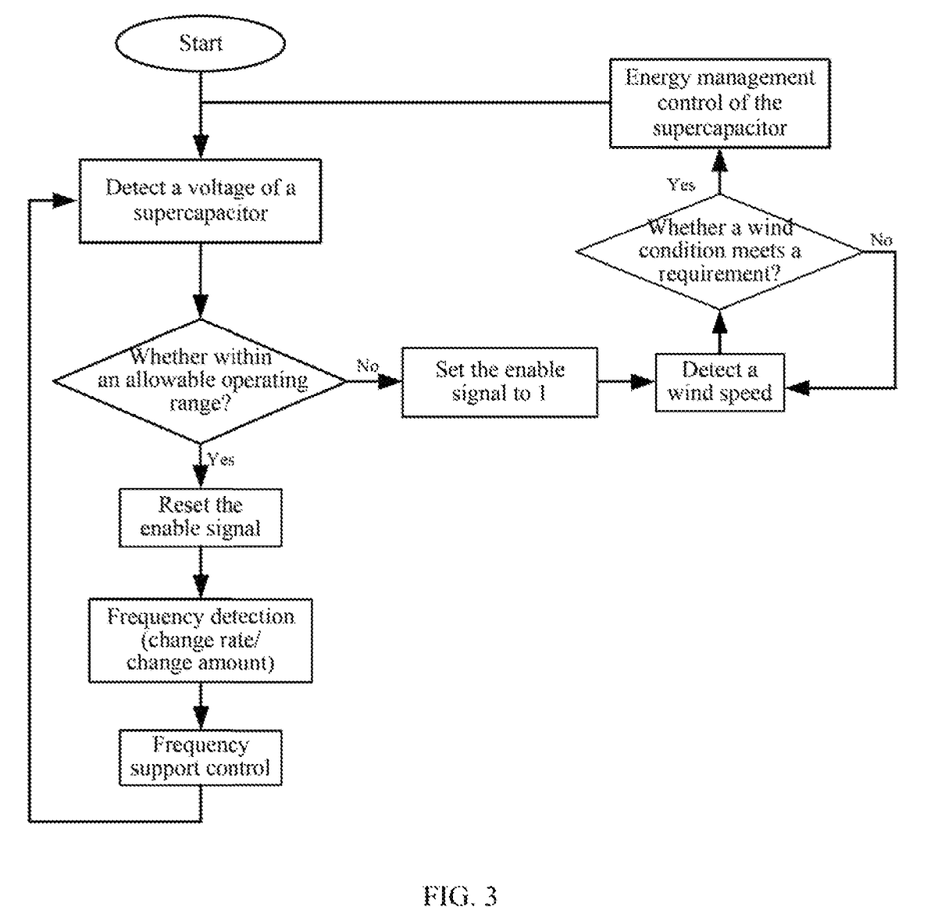
FIG. 3 is a flowchart of a control process of a supercapacitor in FIG. 1.
Figure 4:
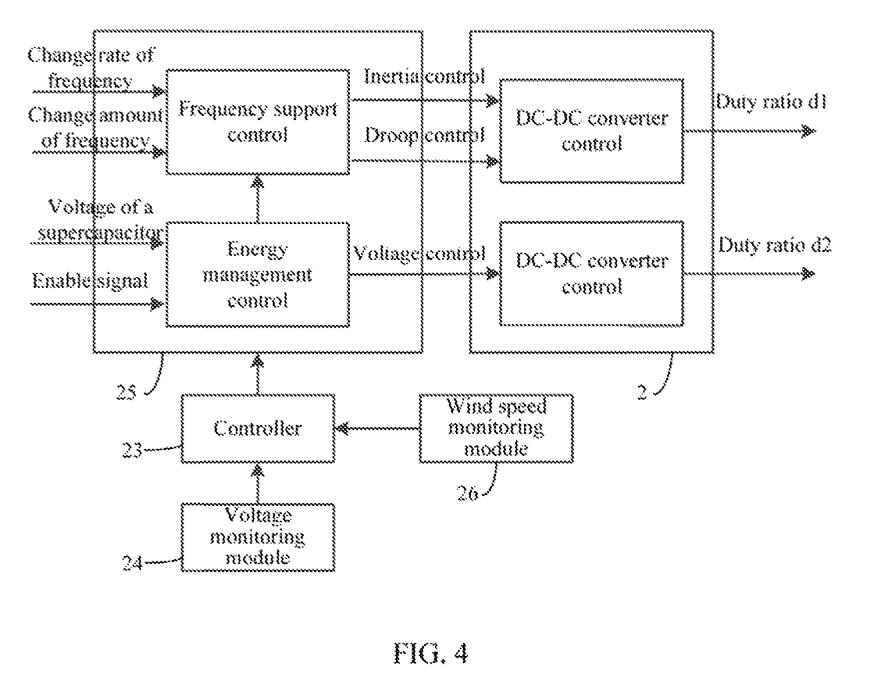
FIG. 4 is a block diagram showing a control of a supercapacitor in FIG. 1.

With reference to FIG. 3 and FIG. 4, the control system for enhancing the frequency support capability of the wind turbine generator system further includes a controller 23, a voltage monitoring module 24 and a voltage control module 25. The voltage monitoring module 24 is used for detecting the voltage of the supercapacitor 22, and the controller 23 determines whether the voltage of the supercapacitor 22 is within an allowable operating range or not. When the controller 23 determines that the voltage of the supercapacitor 22 is within the allowable operating range, i.e., when a first determination result is "yes", the voltage control module 25 adjusts the voltage of the supercapacitor 22 according to a change rate of the frequency of a voltage of the power grid and a change amount of the frequency to meet frequency support control. When the controller 23 determines that the voltage of the supercapacitor 22 is not within the allowable operating range, i.e., when the first determination result is "no", the voltage control module 25 adjusts the voltage of the supercapacitor 22 to be within the allowable operating range. The voltage control module 25 particularly adjusts the voltage of the supercapacitor 22 by controlling the duty ratios of the fully-controlled switches in the DC-DC converter 24.

The allowable operating voltage range of the supercapacitor 22 may be set as required, in one embodiment, may range from 450 V to 960 V. When the voltage of the supercapacitor 22 is within the allowable operating voltage range, the first determination result is "yes", otherwise the first determination result is "no".

In one embodiment, the controller 23 is configured to generate an enable signal representative of the determination result, for example, when the determination result is "no", the enable signal is set to "0", and when the determination result is "yes", the enable signal is set to "1". The voltage control module 25 is configured to receive the enable signal, and switch between a frequency support control mode and a supercapacitor energy management control mode in response to the enable signal, for example, when the enable signal is set to "0", the voltage control module 25 is switched to the frequency support control mode, and when the enable signal is set to "1", the voltage control module 25 is switched to the supercapacitor energy management control mode.

The voltage control module 24 may adjust the voltage of the supercapacitor 22 by controlling the duty ratios (d1/d2) of the first fully-controlled switch S1 and the second fully-controlled switch S2 of the DC-DC converter 24 to achieve frequency support control and supercapacitor energy management control. In one embodiment, when the DC-DC converter 24 operates in the boost mode, the voltage and the current of the supercapacitor are adjusted by adjusting the duty ratio d2 of the second fully-controlled switch S2, when the DC-DC converter 24 operates in the buck mode, the voltage and the current of the supercapacitor are adjusted by adjusting the duty ratio d1 of the first fully-controlled switch S1, and d1 and d2 are complementary to each other, that is, d1=1-d2. d1 and d2 is varied from 0 to 1.

The energy management control of the supercapacitor achieves the voltage control adjustment of the supercapacitor to ensure that the supercapacitor is in a rated operating state. The frequency support control may include inertia control and droop control, where the inertia control is used for improving transient frequency support, and the droop control is used for participating in the primary adjustment of the frequency of the power grid and assisting recovery of the frequency of the power grid.

Figure 5:
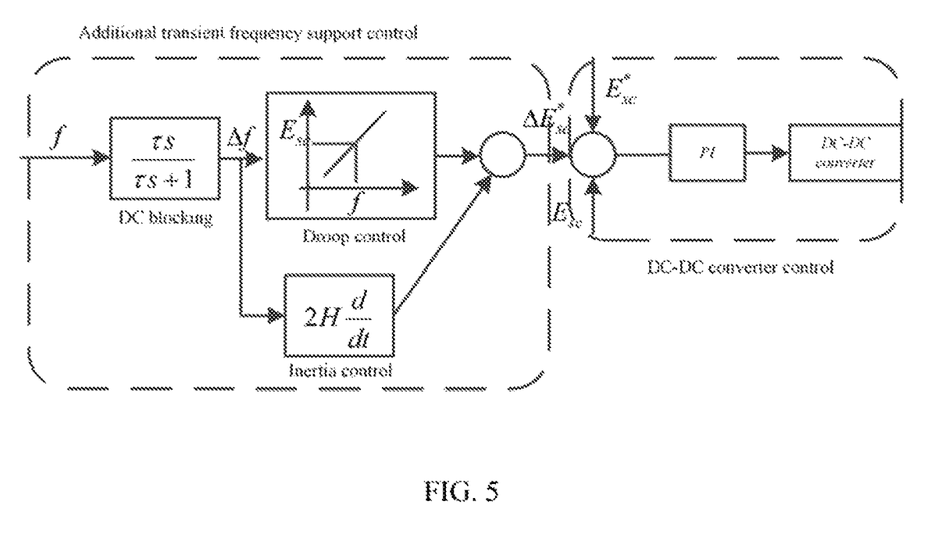
FIG. 5 is a schematic diagram of support control of a supercapacitor in FIG. 1.

With reference to FIG. 5, the voltage control module 24 is configured to perform a frequency response and an inertia response according to the frequency f of the power grid, obtain a frequency response voltage output $E_{sc}^D$ by the droop control, obtain an inertia response voltage output $E_{sc}^I$ by the inertia control, and then obtain a voltage increment control signal $\Delta E_{sc} = E_{sc}^D + E_{sc}^I$ of the supercapacitor 22. The frequency response refers to a change amount $\Delta f$ of the system output power in response to the frequency of the power grid, and the inertia response refers to a change rate $$\frac{\Delta f}{\Delta t}$$

of the system output power in response to the frequency of the power grid.

The change amount $\Delta f$ of the frequency of the power grid may be obtained by performing a DC blocking operation on the system frequency f of the power grid, a time constant of the DC blocking operation is $\tau$, and the DC blocking operation may filter a low-frequency DC component of a frequency signal f out, so that the inertia response control only works when the frequency changes greatly or is in a transient state. When the change rate of the frequency is smaller or the frequency will enter a steady state, the output is 0 after the frequency signal is subjected to the DC blocking operation, and the inertia response control is naturally disconnected.

The inertia response voltage output is $$E_{sc}^I = 2H\frac{df}{dt},$$

where H denotes an inertia time constant of the wind turbine generator system.

The frequency response voltage output $E_{sc}^D$ is obtained by a frequency f-supercapacitor voltage $E_{sc}$ droop curve, and the droop curve may include two linear function curves which are at high frequency and low frequency respectively and have different slopes. Two endpoints of the droop curve are ($f_l, E_{sc}^{low}$) and ($f_u, E_{sc}^{up}$) respectively, where $E_{sc}^{low}$ denotes a predetermined lower limit value of the voltage, $E_{sc}^{up}$ denotes a predetermined upper limit value of the voltage, $f_l$ denotes a lower limit value of the varied frequency of the power grid, and $f_u$ denotes an upper limit value of the varied frequency of the power grid. The allowable operating voltage range of the supercapacitor 22 is the same as or different from $E_{sc}^{low}$ and $E_{sc}^{up}$, and the $E_{sc}^{low}$ and the $E_{sc}^{up}$ may be within the allowable operating voltage range of the supercapacitor 22. The two linear function curves have a common point ($f_*, E_{sc}^*$), that is, when $f_*=1$ p.u. (per unit), $E_{sc}^*=1$ p.u, or when the change in the frequency of the power grid is zero, the voltage of the supercapacitor 22 is a rated voltage. According to the droop curve and the change amount $\Delta f$ of the frequency of the power grid, the frequency response voltage output $E_{sc}^D$ may be obtained. The droop curve uses the voltage of the supercapacitor as an output, so it is easy to ensure that the voltage of the supercapacitor is stable.

The rated voltage $E_{sc}^*$, the $E_{sc}^{low}$ and the $E_{sc}^{up}$ of the supercapacitor meet a power balance formula:

$$\frac{(E_{sc}^*)^2 - (E_{sc}^{low})^2}{2} = \frac{(E_{sc}^{up})^2 - (E_{sc}^*)^2}{2}.$$

Either of the two variables $E_{sc}^{low}$ and $E_{sc}^{up}$ may be calculated according to the power balance formula and the other one, so that upper and lower limits of the allowable operating voltage of the supercapacitor are obtained. The change amount of the frequency is determined by the frequency of the power grid, and $f_l$ and $f_u$ may be determined according to actual needs.

Figure 6:
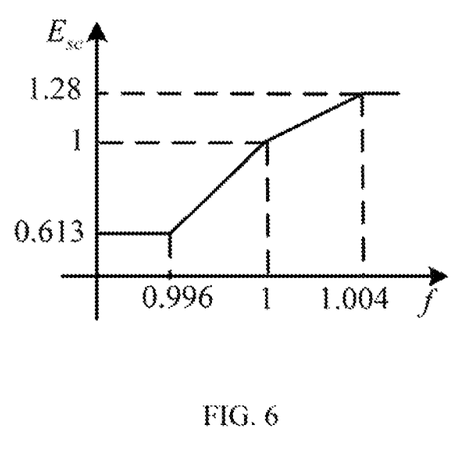
FIG. 6 is a graph showing a droop control curve of a supercapacitor in FIG. 1.

FIG. 6 is a droop control curve in an embodiment. The droop curve does not have a dead zone, because the power adjustment of the supercapacitor does not involve frequent wear of mechanical components. It is considered that when a change in the system frequency is ±0.2 Hz, and the change of the voltage of the supercapacitor reaches upper/lower limit. As shown in FIG. 6, the slope of the droop control curve at high frequency is different from the slope of the droop control curve at the low frequency, which is to ensure that charging and discharging capabilities of the supercapacitor are consistent. In the embodiment of FIG. 6, $E_{sc}^{low}=0.613$ p.u is substituted into the power balance formula, and $E_{sc}^{up}=1.28$ p.u may be obtained. The change amount of the frequency may be determined by the frequency of the power grid, generally, the change amount of the frequency may be ±0.2 Hz, in a 50 Hz system, may be ±0.004 p.u., accordingly, the upper and lower limits of the frequency of FIG. 6 are $f_l=0.996$, $f_u=1.004$.

An incremental voltage signal $\Delta E_{sc}$ is superimposed on a rated operating voltage $E_{sc}^*$ of the supercapacitor to form a new command signal $E_{sc}^* + \Delta E_{sc}$. By controlling the duty ratios d1/d2 of the first fully-controlled switch S1 and the second fully-controlled switch S2 of the DC-DC converter 24, the voltage of the supercapacitor may be adjusted to $E_{sc}^* + \Delta E_{sc}$. Specifically, when $\Delta E_{sc} \leq 0$, it means that the supercapacitor needs to increase (inject) an output power, and the duty ratios d1/d2 are adjusted (for example, by controlling the duty ratio d2 of the switch S2 to be greater than 0.5, d1+d2=1), the DC-DC converter 24 operates in the boost mode, that is, the supercapacitor is discharged to lower its voltage. If $\Delta E_{sc}>0$, it means that the supercapacitor needs to reduce (absorb) the output power, and at this time, the duty ratios d1/d2 are adjusted (for example, by controlling the duty ratio d1 of the switch S1 be greater than 0.5, d1+d2=1), so that the DC-DC converter 24 operates in the buck mode, that is, the supercapacitor is charged to increase its voltage, thereby achieving inertia and frequency responses, and finally achieving commanded response.

It is noted that the frequency control and the inertia control both use a voltage incremental of the supercapacitor 22 as output, without using a more intuitive power output due to the voltage limitation of the supercapacitor 22, such configuration is more compact and easy to couple to a control loop of the supercapacitor 22.

The power injection/absorbing of the supercapacitor 22 is achieved via the grid-side converter 74. When the system frequency is increased, the supercapacitor 22 operates in the buck mode through the DC-DC converter 24, and absorbs a portion of the output power of the rotor converter 72, thereby reducing the total access power of the wind turbine generator system. When the system frequency is reduced, the supercapacitor 22 operates in the boost mode through the DC-DC converter 24, and injects an active power through the grid-side converter 74, thereby increasing the total access power of the wind turbine generator system. Since the supercapacitor 22 needs to be injected into the power grid via the grid-side converter 74 for realizing the transient frequency support control, under the rated output of the blower, the supercapacitor 22 cannot inject the power in theory. However, in fact, the converter has a certain long-term overload capability, so that the capacity limitation of the grid-side converter 74 is not considered when this function is implemented.

In addition, the control system for enhancing the frequency support capability of the wind turbine generator system may further include a wind speed monitoring module 26. When the first judgment result of the controller 23 is "no", the controller 23 further determines whether a current wind speed meets a requirement or not. When the controller 23 determines that the current wind speed meets the requirement, that is, when a second determination result is "yes", the voltage control module 24 adjusts the voltage of the supercapacitor. When the controller 23 determines that the current wind speed does not meet the requirement, that is, when the second determination result is "no", the voltage control module 24 does not adjust the voltage of the supercapacitor, and the controller 23 continues to determine whether the current wind speed meets the requirement or not. Only when the current wind speed meets the requirement, the voltage control module 24 adjusts the voltage of the supercapacitor.

In one embodiment, the wind speed monitoring module 26 directly monitors a wind speed near the wind turbine 3 of the wind turbine generator system. A first wind speed which has a relatively high value is set to represent it is in a heavy-wind state at present, and a second wind speed which has a relatively low value is set to represent it is in a small-wind state at present. In another embodiment, the wind speed monitoring module 26 indirectly determines the wind speed by detecting the power of the wind turbine generator system. A first power of the wind turbine generator system which has a relatively high value is set to represent that it is in the heavy-wind state at present, and a second power of the wind turbine generator system which has a relatively low value is set to represent that it is in the small-wind state at present. When the controller 23 determines that the voltage of the supercapacitor is lower than the lower limit of the allowable operating voltage range, the controller 23 further determines whether the current wind speed meets the heavy-wind criteria or not. When the current wind speed meets the heavy-wind criteria, the voltage control module 24 switches the DC-DC converter 24 to the buck mode by controlling the duty ratio of the switch S1/S2 to charge the supercapacitor 22. When the controller 23 determines that the voltage of the supercapacitor is higher than the upper limit of the allowable operating voltage range, the controller 23 further determines whether the current wind speed meets the small-wind criteria or not. When the current wind speed meets the small-wind criteria, the voltage control module 24 switches the DC-DC converter 24 to the boost mode by controlling the duty ratio of the switch S1/S2 to discharge the supercapacitor 22.

The enable signal is a signal to start the supercapacitor energy management control mode. The charged state of the supercapacitor is changed after participating in the inertia control (for a change rate of the f) and the droop control (for a deviation amount), so the supercapacitor needs to be discharged or charged, so as to ensure that the voltage of the supercapacitor is within the operating voltage range. When the voltage of the supercapacitor is lower than the operating voltage, the power state of the wind turbine generator system is detected, and the supercapacitor is preferably charged in the heavy-wind state (a power-limited state); and when the voltage of the supercapacitor is higher than the operating voltage, the supercapacitor is preferably discharged in the small-wind state.

An embodiment of the present disclosure further provides a control method for enhancing a frequency support capability of a wind turbine generator system. The method includes the following steps.

A voltage of a supercapacitor 22 is periodically detected.

It is determined whether the voltage of the supercapacitor 22 is within an allowable operating range or not.

When the voltage of the supercapacitor 22 is within the allowable operating range, the voltage of the supercapacitor 22 is adjusted according to a change rate of a frequency of a voltage of a power grid and a change amount of the frequency to meet the requirement of the frequency support control;

When the voltage of the supercapacitor 22 is not within the allowable operating range, it is further periodically detected whether a current wind speed meets a requirement or not.

When the voltage of the supercapacitor 22 is out of the allowable operating range and the wind speed does not meet the requirement, the voltage of the supercapacitor 22 is not adjusted.

When the voltage of the supercapacitor 22 is within the allowable operating range and the wind speed meets the requirement, the supercapacitor energy management control is performed to adjust the voltage of the supercapacitor 22 to be within the allowable operating range.

The process of adjusting the voltage of the supercapacitor 22 to meet frequency support control includes: switching the DC-DC converter 24 between the boost mode and the buck mode by controlling the duty ratio of the switches of the DC-DC converter 24, and adjusting the voltage of the supercapacitor 22 to $E_{sc}^{*}+\Delta E_{sc}$.

The process of adjusting the voltage of the supercapacitor 22 to be within the allowable operating voltage range includes the following steps.

When the voltage of the supercapacitor is lower than the lower limit of the allowable operating voltage range, it is determined whether the current wind speed meets the heavy-wind criteria or not.

When the current wind speed meets the heavy-wind criteria, the DC-DC converter 24 is switched to the buck mode to charge the supercapacitor 22.

When the voltage of the supercapacitor is higher than the upper limit of the allowable operating voltage range, it is determined whether the current wind speed meets the small-wind criteria or not.

When the current wind speed meets the small-wind criteria, the DC-DC converter 24 is switched to the boost mode to discharge the supercapacitor 22.

The present disclosure provides a control system and a control method for enhancing a frequency support capability of a wind turbine generator system by employing a supercapacitor. The control system and the control method may be used for improving a fault handling capability of the doubly-fed wind turbine generator system, and have inertia support and frequency response capabilities, better technical and economic feasibilities. In addition, an original control strategy of the wind turbine generator system is not changed. Compared with the existing art, the control system and the control method will not cause problems such as blower stall, secondary frequency dip, fatigue load, and the like. The supercapacitor energy storage system may be orderly charged or discharged according to an operating state of the wind turbine generator system to maintain its own operating condition, and has a superior reliability.

The above-mentioned embodiments are merely several embodiments of the present disclosure, are described relatively particularly, but are not construed as limiting the scope of the present disclosure. It should be noted that a number of variations and modifications may be made by those skilled in the art without departing from the spirit and scope of the present disclosure, and the variations and modifications are in a protective scope of the present disclosure. Accordingly, the protective scope of the present disclosure should be determined by the appended claims.

What is claimed is:

1. A control system of a wind turbine generator system, comprising: a wind turbine, a gearbox, an electric generator and a converter, wherein the control system further comprises a supercapacitor energy storage apparatus, wherein the supercapacitor energy storage apparatus comprises a DC-DC converter and a supercapacitor, wherein the converter comprises DC buses, and the supercapacitor is electrically connected to the DC buses via the DC-DC converter, wherein the control system further comprises: a voltage monitoring module, a controller, and a voltage control module:

the voltage monitoring module is configured to detect a voltage of the supercapacitor;

the controller is configured to determine whether the voltage of the supercapacitor is within an allowable operating range or not, and the voltage control module is configured to adjust, when the voltage of the supercapacitor is out of the allowable operating range, the voltage of the supercapacitor to be within the allowable operating range, wherein the controller is further configured to, when determining that the voltage of the supercapacitor is lower than a lower limit of the voltage range, further determine whether a current wind speed meets a heavy-wind criteria or not; and when the current wind speed is determined to meet the heavy-wind criteria the voltage control module is configured to charge the supercapacitor;

when the controller determines that the voltage of the supercapacitor is higher than an upper limit of the voltage range, the controller is configured to further determine whether the current wind speed meets a light-wind criteria or not, and the voltage control module is configured to discharge the supercapacitor when the current wind speed meets the light-wind criteria.

2. The control system of a wind turbine generator system according to claim 1, wherein the DC-DC converter is a buck-boost bidirectional converter, when electrical energy is inputted from the DC buses to the supercapacitor, the DC-DC converter operates in a buck mode, and when electrical energy is inputted from the supercapacitor to the DC buses, the DC-DC converter operates in a boost mode, and a voltage of the supercapacitor is adjusted by controlling a duty ratio of a switch in the DC-DC converter.

3. The control system of a wind turbine generator system according to claim 1, wherein the DC buses comprise a first DC bus and a second DC bus, wherein the DC-DC converter comprises an inductor, a first fully-controlled switch and a second fully-controlled switch, a first end of the inductor is connected in series with the first fully-controlled switch and connected to the first DC bus through the first fully-controlled switch, a second end of the inductor is electrically connected to a first electrode of the supercapacitor, a second electrode of the supercapacitor is electrically connected to the second DC bus, and the second fully-controlled switch is electrically connected between the first end of the inductor and the second electrode of the supercapacitor.

4. The control system of a wind turbine generator system according to claim 3, wherein the first fully-controlled switch comprises a first transistor and a first diode connected in parallel, wherein a drain of the first transistor is connected to an anode of the first diode and connected to the first end of the inductor, a source of the first transistor is connected to a cathode of the first diode and connected to the first DC bus; wherein the second fully-controlled switch comprises a second transistor and a second diode connected in parallel, a source of the second transistor is connected to a cathode of the second diode and connected to the first end of the inductor, and a drain of the second transistor is connected to an anode of the second diode and electrically connected to the second electrode of the supercapacitor.

5. The control system of a wind turbine generator system according to claim 1, wherein the voltage control module is configured to perform frequency support control by adjusting the voltage of the supercapacitor to $E^*_{sc}+\Delta E_{sc}$ through the DC-DC converter, wherein $E^*_{sc}$ represents a rated operating voltage of the supercapacitor, $\Delta E_{sc}$ represents an incremental voltage, and $\Delta E_{sc}$ is equal to a sum of an inertia response voltage output and a frequency response voltage output.

6. The control system of a wind turbine generator system according to claim 5, wherein the inertia response voltage output meets $$E^i_{sc} = 2H\frac{df}{dt}.$$

7. The control system of a wind turbine generator system according to claim 5, wherein the frequency response voltage output $E_{sc}^D$ is obtained by a frequency f-supercapacitor voltage $E_{sc}$ droop curve, and two endpoints of the droop curve are $(f_l, E_{sc}^{low})$ and $(f_u, E_{sc}^{up})$ respectively, and wherein $f_l$ is a lower limit value of a change of the frequency of the power grid, and $f_u$ is an upper limit value of the change of the frequency of the power grid.

8. The control system of a wind turbine generator system according to claim 1, wherein the controller is configured to: when the voltage of the supercapacitor is out of the allowable operating range, further determine whether a current wind speed meets a requirement or not; the voltage control module is configured to: when the controller determines that the current wind speed meets the requirement, adjust the voltage of the supercapacitor.

9. The control system of a wind turbine generator system according to claim 1 wherein the controller is configured to determine whether the current wind speed meets the heavy-wind criteria or the light-wind criteria according to a power of the wind turbine generator system.

10. The control system of a wind turbine generator system according to claim 1, wherein control system is configured to implement the following controls:
detecting the voltage of the supercapacitor, and determining whether the voltage of the supercapacitor is within an allowable operating range or not to obtain a first determination result;
when the first determination result is "yes", setting an enable signal to "0", and detecting a change rate of a frequency of a voltage of the power grid and a change amount of the frequency, which serve as input signals of frequency support control;
when the first determination result is "no", setting the enable signal to "1", and further detecting whether a wind speed meets a requirement or not to obtain a second determination result; and
when the second determination result is "yes", enabling a supercapacitor energy management control to adjust the voltage of the supercapacitor to be within the allowable operating range.

11. The control system of a wind turbine generator system according to claim 1, wherein the supercapacitor is configured to: when a system frequency is increased, shunt an output power of a rotor converter, and reduce a total access power of the wind turbine generator system; and when the system frequency is reduced, inject an active power through a grid-side converter, and increase the total access power of the wind turbine generator system.

12. The control system of a wind turbine generator system according to claim 1, further comprising a crowbar protection circuit, which is connected to a rotor of the electric generator.

13. The control system of a wind turbine generator system according to claim 1, further comprising a transformer, wherein the electric generator is connected to a power grid through the transformer.

* * * * *